United States Patent
Fujiwara et al.

(10) Patent No.: US 9,900,466 B2
(45) Date of Patent: Feb. 20, 2018

(54) IMAGE PROCESSING APPARATUS (71) Applicant: RISO KAGAKU CORPORATION, Minato-ku, Tokyo (JP)

(72) Inventors: Daisuke Fujiwara, Tsukuba (JP); Yukio Yoshikawa, Tsukuba (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/437,163

(22) Filed: Feb. 20, 2017

(65) Prior Publication Data
US 2017/0244861 A1    Aug. 24, 2017

(30) Foreign Application Priority Data

Feb. 24, 2016  (JP) .................................. 2016-032958

(51) Int. Cl.
*H04N 1/405* (2006.01)
*G06K 15/00* (2006.01)
*H04N 1/40* (2006.01)
*G06K 15/02* (2006.01)

(52) U.S. Cl.
CPC ......... *H04N 1/4053* (2013.01); *G06K 15/021* (2013.01); *G06K 15/028* (2013.01); *G06K 15/1836* (2013.01); *G06K 15/1847* (2013.01); *H04N 1/4052* (2013.01); *G06K 2215/0042* (2013.01); *G06K 2215/0097* (2013.01); *H04N 2201/0082* (2013.01)

(58) Field of Classification Search
CPC ............... H04N 1/4053; H04N 1/4052; H04N 2201/0082; G06K 15/021; G06K 15/028; G06K 15/1836; G06K 15/1847; G06K 2215/0042; G06K 2215/0097
See application file for complete search history.

(56) References Cited

U.S. PATENT DOCUMENTS

| 6,563,957 B1 * | 5/2003 | Li ........................ H04N 1/4052 358/3.03 |
| 2003/0107769 A1 * | 6/2003 | Kang .................... H04N 1/4053 358/3.03 |

FOREIGN PATENT DOCUMENTS

JP          11328357 A      11/1999

* cited by examiner

*Primary Examiner* — Quang N Vo
(74) *Attorney, Agent, or Firm* — Holtz, Holtz & Volek PC (57) ABSTRACT

An image processing apparatus includes an image processor that performs error diffusion processing by applying an error diffusion matrix to multi-valued image data having pixels two-dimensionally arranged, so as to convert the multi-valued image data into binary image data. The binarization unit applies an error diffusion matrix in which the diffusion coefficient of a pixel diagonal to a focused-on pixel is greater than those of other pixels.

2 Claims, 10 Drawing Sheets

ERROR DIFFUSION MATRIX

|     |     | *   | p1  | p2  |
| --- | --- | --- | --- | --- |
| p3  | p4  | p5  | p6  | p7  |
| p8  | p9  | p10 | p11 | p12 |

IMAGE PROCESSING APPARATUS

CROSS-REFERENCE TO RELATED APPLICATION

This application is based upon and claims the benefit of priority of the prior Japanese Patent Application No. 2016-032958, filed on Feb. 24, 2016, the entire contents of which are incorporated herein by reference.

BACKGROUND OF THE INVENTION

Field of the Invention

The present invention relates to an image processing apparatus that processes image data for printing.

Description of the Related Art

In printing a multi-gradation image, the image is subjected to binarization processing in conformity with a printing apparatus. However, simply binarizing a multi-gradation image causes an intermediate concentration to be lost and thus decreases the image quality. Hence, various types of binarization processing that allow prevention of a decrease in image quality have been proposed. Error diffusion methods are widely known as representative techniques.

Error diffusion methods have been improved in various ways. In a conventional error diffusion method, particular textures may be generated at or around an intermediate concentration. Accordingly, an image processing apparatus has been proposed that adds random noise to image data so as to make the textures unnoticeable, and that changes a threshold for binarization processing according to the noise so as to prevent the image quality from decreasing due to the noise addition (see patent document 1).

[Patent Document 1] Japanese Laid-open Patent Publication No. 11-328357

SUMMARY OF THE INVENTION

As described above, in the conventional error diffusion processing, textures with links between dots having a regular periodicity are generated at or around an intermediate concentration. Particularly in printing a photographic image, many textures are generated, and this greatly decreases the print quality of the photographic image. To improve print quality, there is a need for a technique to suppress a generation of textures in error diffusion processing.

To achieve the object described above, an image processing apparatus that performs binarization processing of multi-valued image data using an error diffusion method so as to output the binary image data to an image formation apparatus includes an image processor that performs error diffusion processing by applying a predetermined error diffusion matrix to multi-valued image data having pixels two-dimensionally arranged in a main scanning direction that is a direction in which heads are arranged and in a subscanning direction orthogonal to the main scanning direction, so as to convert the multi-valued image data into binary image data, wherein the image processor applies, as the error diffusion matrix, an error diffusion matrix in which the diffusion coefficient of a pixel diagonal to a focused-on pixel is greater than those of the pixels other than the pixel diagonal to the focused-on pixel.

DETAILED DESCRIPTION OF THE PREFERRED EMBODIMENTS

Figure 1:
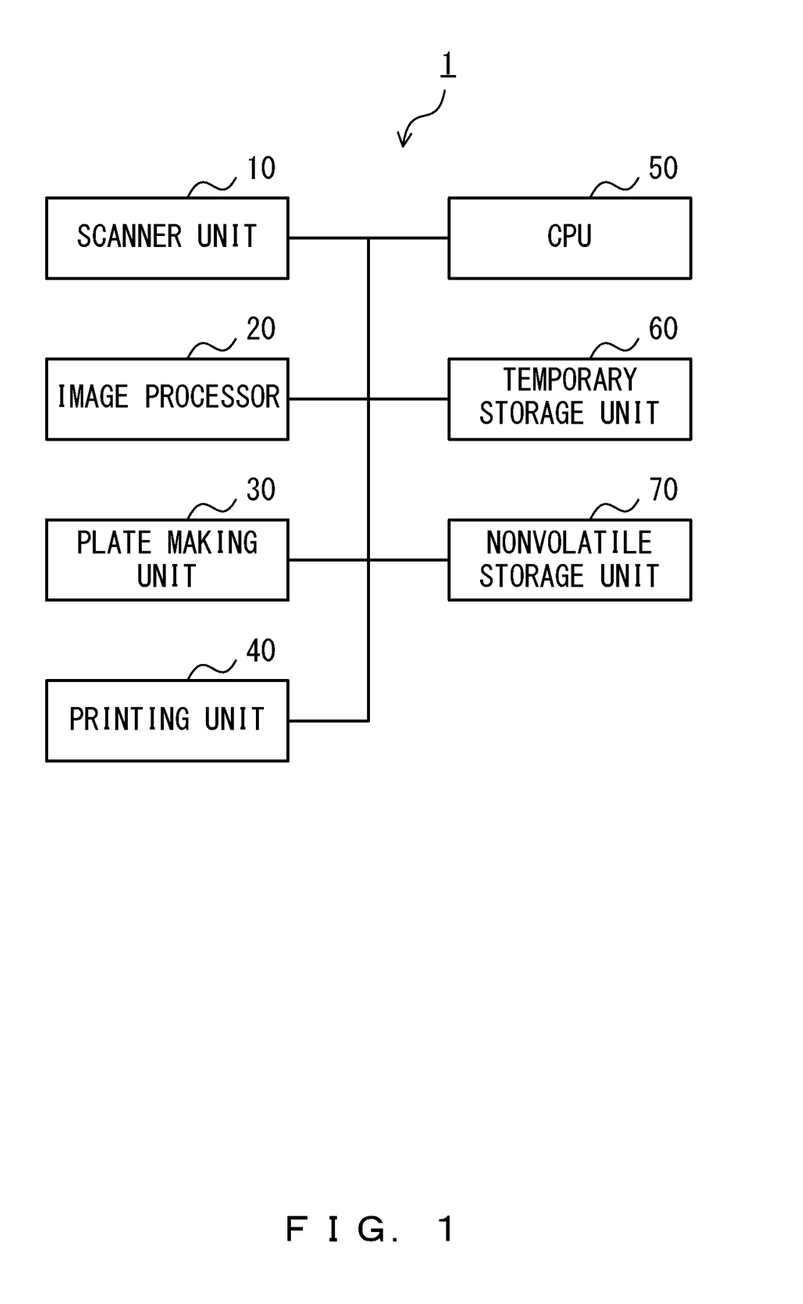
FIG. 1 is a hardware block diagram illustrating an exemplary configuration of an image formation apparatus.

The following describes an image processing apparatus in accordance with embodiments of the present invention by referring to the drawings. FIG. 1 is a hardware block diagram illustrating an exemplary configuration of an image formation apparatus 1. The present embodiment is described using a screen printing apparatus as a specific example of the image formation apparatus 1. However, the image formation apparatus 1 is not limited to a screen printing apparatus and may be an inkjet printing apparatus.

A screen printing apparatus melts the film of screen printing paper using thermal heads so as to form holes through the paper, thereby providing a printing plate to be used for printing to produce many duplications. In particular, first, the screen printing apparatus drives, for example, the thermal heads according to image data obtained by reading a document with, for example, a scanner so as to bore holes by melting screen printing paper, and performs plate-making processing on the screen printing paper, thereby producing a printing plate. Then, the screen printing apparatus wraps the produced printing plate around a print drum. In addition, the screen printing apparatus supplies ink from the inside of the print drum and performs printing by transferring the ink to a print sheet using, for example, a roller.

The image formation apparatus 1 includes a scanner unit 10, an image processor 20, a plate making unit 30, a printing unit 40, a CPU (Central Processing unit) 50, a temporary storage unit 60, and a nonvolatile storage unit 70.

The scanner unit 10 includes a line image sensor that photoelectrically reads image information of a document. The scanner unit 10 reads the document by scanning the document with the line image sensor and outputs multi-valued monochrome or color image data. The scanner unit 10 may be referred to as an image reading unit or an image input unit.

The image processor 20 applies, for example, edge enforcement processing and density correction processing to the multi-valued image data output from the scanner unit 10, and performs binarization processing so as to output binary data. The entirety of, or portions of, the image processor 20 consists of, for example, a gate array. Details of the image processor 20 will be described hereinafter.

The plate making unit 30 performs plate-making processing according to image data binarized by the image processor 20. The plate making unit 30 includes thermal heads that include a plurality of heat generators arranged in a line. Using the thermal heads, the plate making unit 30 performs plate-making processing of screen printing paper unspooled from a screen printing paper roll. The plate making unit 30 may comprise two plate making units, a first plate making unit (not illustrated) and a second plate making unit (not illustrated).

The printing unit 40 performs printing on a print sheet using the screen printing paper produced by the plate making unit 30. The printing unit 40 includes, for example, a paper feed stand in which print sheets are stored (not illustrated), a transportation unit that transports a print sheet (not illustrated), a print drum around which screen printing paper is wrapped (not illustrated), a press roller that presses a print sheet against the print drum (not illustrated), and a paper ejection stand from which a print sheet is ejected after printing (not illustrated).

The CPU 50 reads a control program and comprehensively performs control processing of the image formation apparatus 1 in accordance with the read control program. The temporary storage unit 60 temporarily stores image data, the control program, and plate-making-processing data provided by the plate making unit 30. The temporary storage unit 60 is, for example, a DRAM (Dynamic Random Access Memory).

The nonvolatile storage unit 70 stores a control program, various types of data, and a table in a nonvolatile manner. The nonvolatile storage unit 70 is, for example, an HDD (Hard Disk Drive) or a flash memory.

Figure 2:
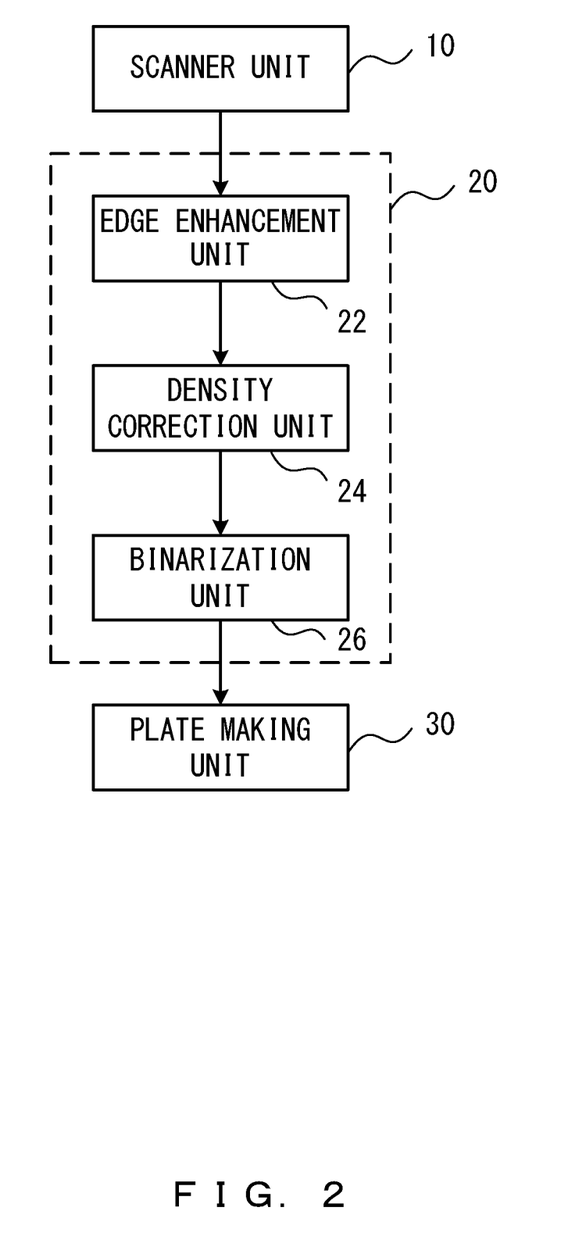
FIG. 2 is a functional block diagram of an image processor.

FIG. 2 is a functional block diagram of the image processor 20. The image processor 20 includes an edge enhancement unit 22, a density correction unit 24, and a binarization unit 26. As described above, multi-valued image data from the scanner unit 10 is input to the image processor 20. The edge enhancement unit 22 applies digital filter processing to the input multi-valued image data so as to enhance an image contour. By referring to a γ correction table stored in the nonvolatile storage unit 70, the density correction unit 24 applies, for example, γ correction processing to the multi-valued image data that has undergone counter enhancement processing.

The binarization unit 26 applies error diffusion processing to the multi-valued image data that has undergone density correction processing, so as to convert the data into binary data. The image processor 20 outputs the binary data to the plate making unit 30. Error diffusion processing includes binarizing multi-valued image data by comparing the data with a predetermined threshold, and diffusing a difference between the input image data and the threshold among neighboring pixels to subsequently undergo binarization processing.

The plate making unit 30 fabricates a printing plate by driving the thermal heads according to binary data. Details of binarization processing performed by the binarization unit 26 are described with reference to FIG. 3.

Figure 3:
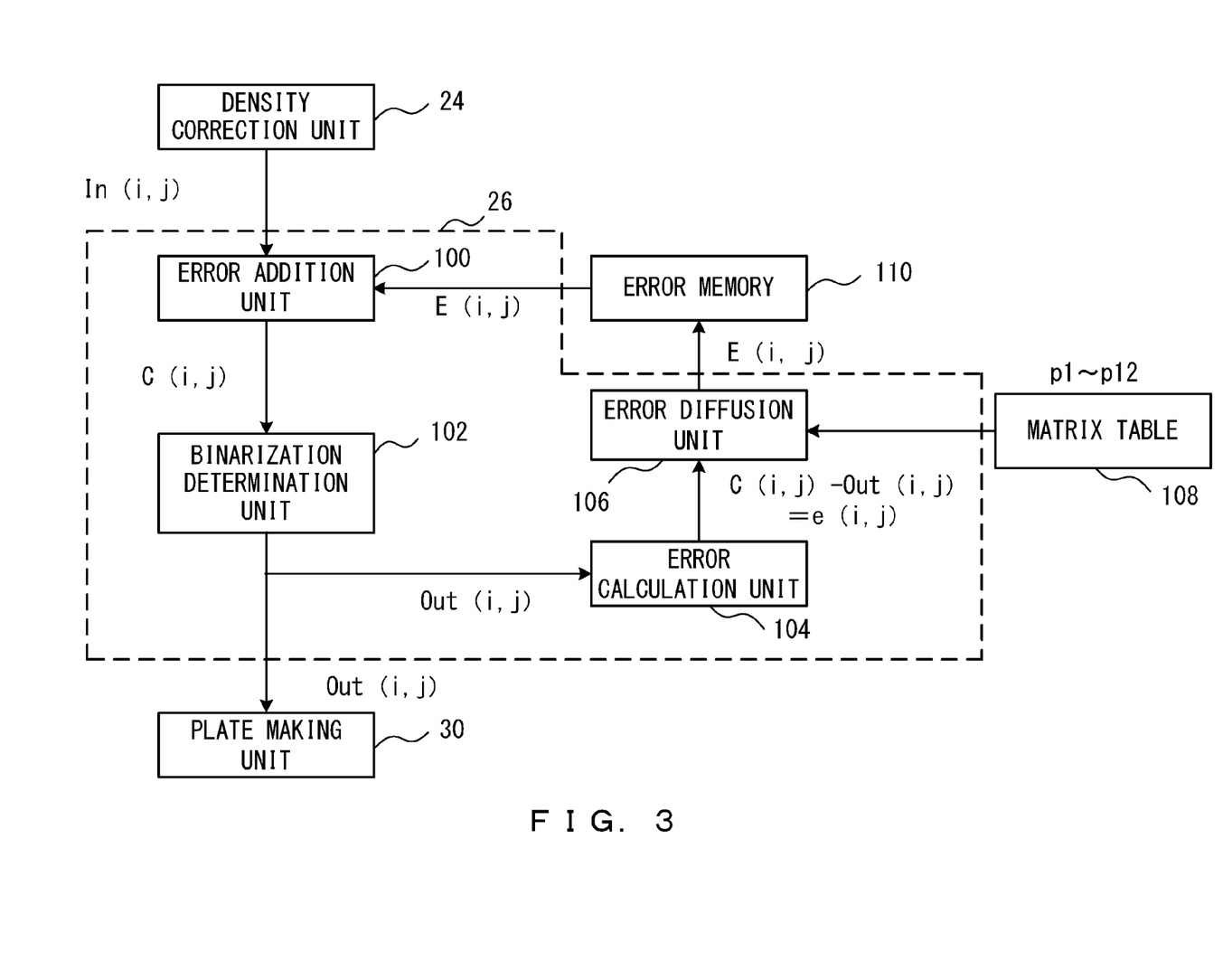
FIG. 3 is a functional block diagram related to error diffusion processing performed by a binarization unit.

FIG. 3 is a functional block diagram related to error diffusion processing performed by the binarization unit 26. The binarization unit 26 includes an error addition unit 100, a binarization determination unit 102, an error calculation unit 104, an error diffusion unit 106, a matrix table 108, and an error memory 110. The following specifically describes functions of those units in accordance with the processing flow. Assume that image data has 256 gradations of gray (0-255).

Figure 4:
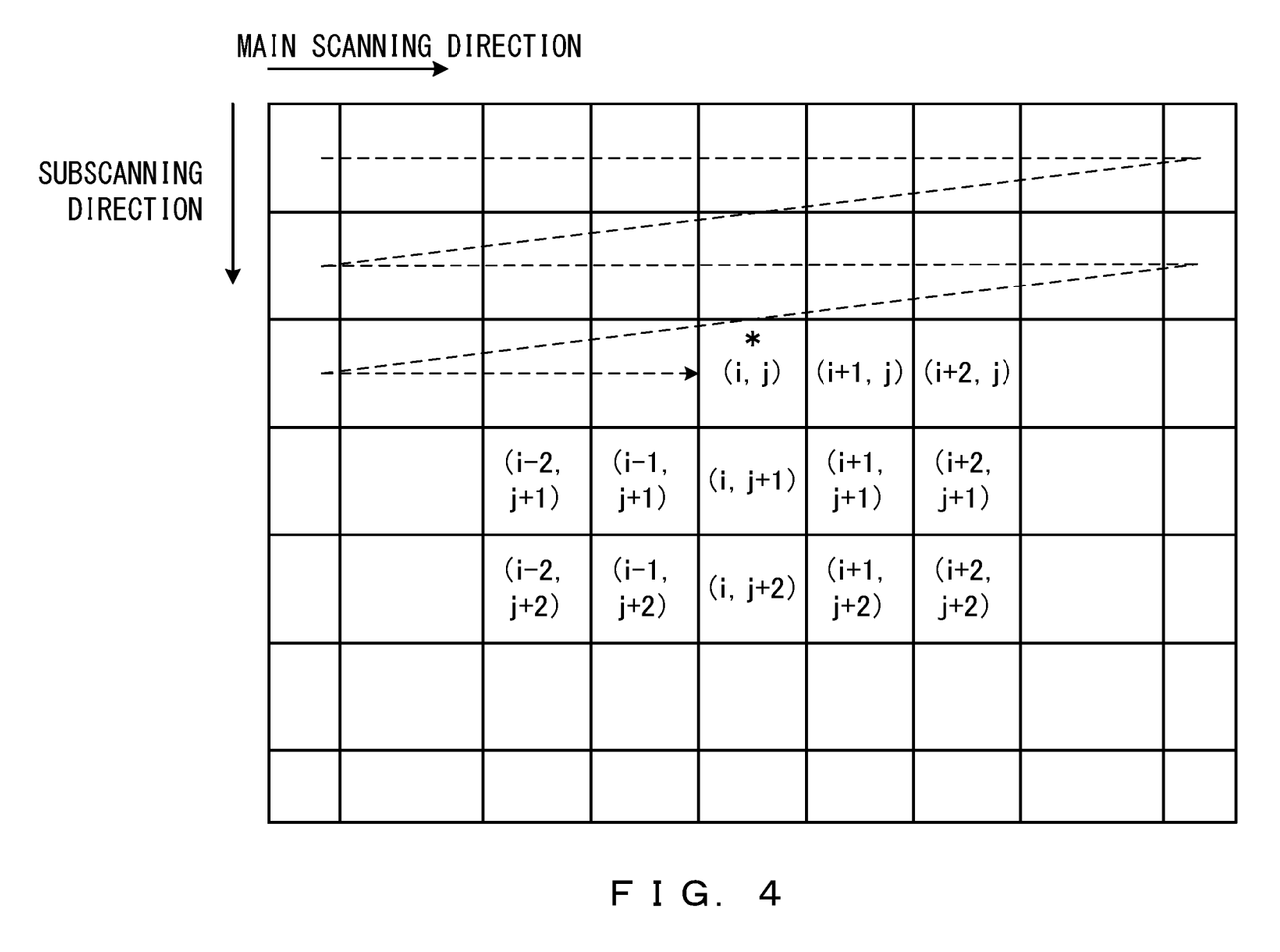
FIG. 4 illustrates a pixel arrangement for image data.

FIG. 4 illustrates a pixel arrangement for input image data. As depicted in FIG. 4, image data is arranged two dimensionally in vertical and lateral directions. In FIG. 4, an i direction is the lateral direction, and a j direction is the vertical direction. A pixel is expressed as (i, j). i represents an address for a main scanning direction, and j represents an address for a subscanning direction. The main scanning direction is a direction in which heads of the image formation apparatus 1 are arranged in line. The subscanning direction is orthogonal to the main scanning direction. The subscanning direction is also a direction in which a document is transported for reading or a direction in which a reading unit is transported.

The binarization unit 26 performs binarization processing for pixels in an order indicated by broken lines in FIG. 4. A pixel to be binarized at that time is hereinafter referred to as a focused-on pixel and expressed by "*".

The error addition unit 100 adds error data E(i, j) of a focused-on pixel that has been read from the error memory 110 to multi-valued input image data In(i, j) of the focused-on image so as to calculate corrected image data C(i, j). Input image data In (i, j) is 0 to 255.

$$In(i, j)+E(i, j)=C(i, j)$$

The binarization determination unit 102 compares corrected image data C(i, j) with a predetermined threshold Th so as to output binary data Out(i, j). The predetermined threshold Th is, for example, 127. When corrected image data C(i, j)>Th, the binarization determination unit 102 outputs 255; when corrected image data C(i, j)≤Th, the binarization determination unit 102 outputs 0.

The error calculation unit 104 calculates a binarization error e(i, j) according to a difference between corrected image data C(i, j) and binary data Out(i, j).

$$C(i, j)-Out(i, j)=e(i, j)$$

When, for example, C(i, j)=100 holds, Out(i, j)=0 is satisfied according to Th=127, leading to binarization error e(i, j)=100.

The error diffusion unit 106 multiplies a diffusion coefficient of an error diffusion matrix allocated in accordance with the position of a neighboring pixel by binarization error e(i, j), so as to calculate error data E(i, j) for each pixel. The error diffusion unit 106 reads a diffusion coefficient table for error diffusion matrixes from the matrix table 108. The matrix table 108 is included in the nonvolatile storage unit 70.

Figure 5:
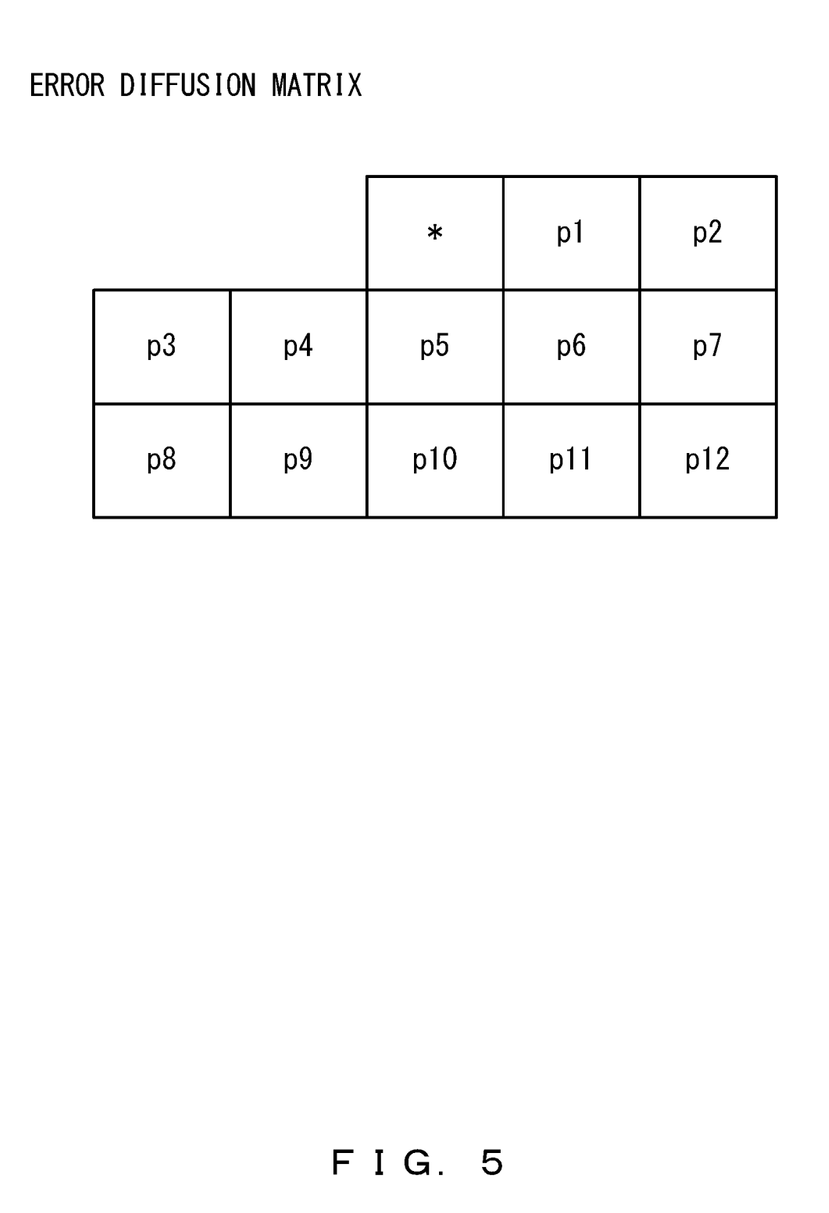
FIG. 5 illustrates a correlation between diffusion coefficients.

Calculation formulae for error data E(i, j) are indicated below. In this example, the size of the error diffusion matrix is 5×3. FIG. 5 depicts an exemplary 5×3 error diffusion matrix, and p1-p12 are diffusion coefficients of individual pixel positions.

$$E(i+1, j)=E(i+1, j)+e(i, j)\times p1$$

$$E(i+2, j)=E(i+2, j)+e(i, j)\times p2$$

$$E(i-2, j+1)=E(i-2, j+1)+e(i, j)\times p3$$

$$E(i-1, j+1)=E(i-1, j+1)+e(i, j)\times p4$$

$$E(i, j+1)=E(i, j+1)+e(i, j)\times p5$$

$$E(i+1, j+1)=E(i+1, j+1)+e(i, j)\times p6$$

$$E(i+2, j+1)=E(i+2, j+1)+e(i, j)\times p7$$

$$E(i-2, j+2)=E(i-2, j+2)+e(i, j)\times p8$$

$$E(i-1, j+2)=E(i-1, j+2)+e(i, j)\times p9$$

$E(i, j+2)=E(i, j+2)+e(i, j) \times p10$ $E(i+1, j+2)=E(i+1, j+2)+e(i, j) \times p11$ $E(i+2, j+2)=E(i+2, j+2)+e(i, j) \times p12$ The error diffusion unit 106 adds the calculated error data E to error data E of a corresponding position that has been stored in the error memory. The error memory 110 is included in the temporary storage unit 60.

Figure 6:
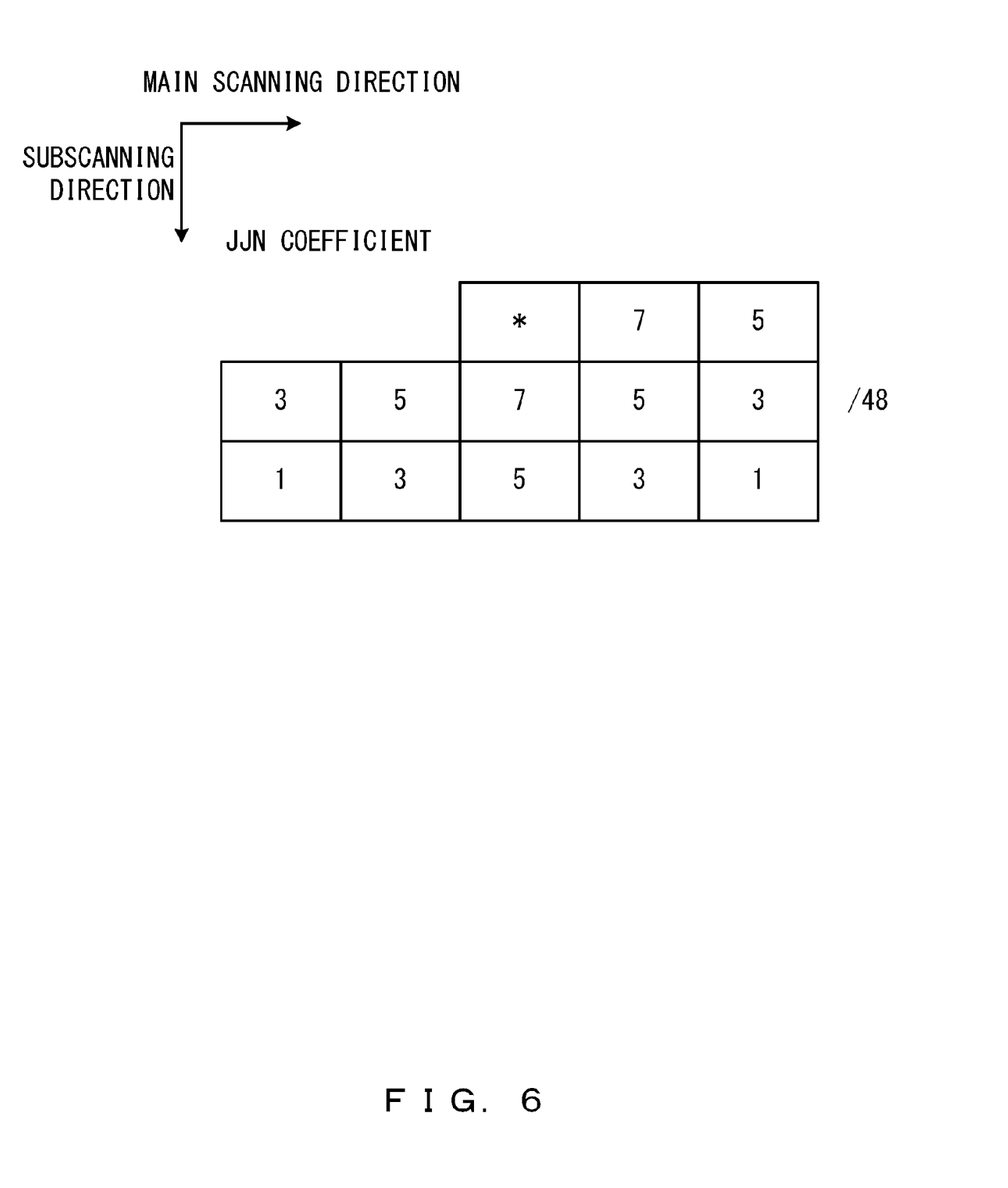
FIG. 6 illustrates JJN coefficients.

The following describes specific examples of diffusion coefficients of an error diffusion matrix. Diffusion coefficients of an error diffusion matrix are described by indicating textures generated by each of the diffusion coefficients. First, a JJN coefficient, which is known in a conventional error diffusion method, is described as a comparative example. JJN coefficients are diffusion coefficients of an error diffusion matrix proposed by Jarvis, Judice and Ninke. FIG. 6 indicates the values of JJN coefficients. The orientation of the JJN coefficients is such that the main scanning direction is a lateral direction, as in FIG. 5. In FIG. 6, only the numerators of coefficients are indicated, and the denominator "1/48" is omitted. "*" represents a focused-on pixel, as described above. As depicted in FIG. 6, the JJN coefficients are set in a manner such that a greater weight is assigned to pixels closer to the focused-on pixel.

Figure 10:
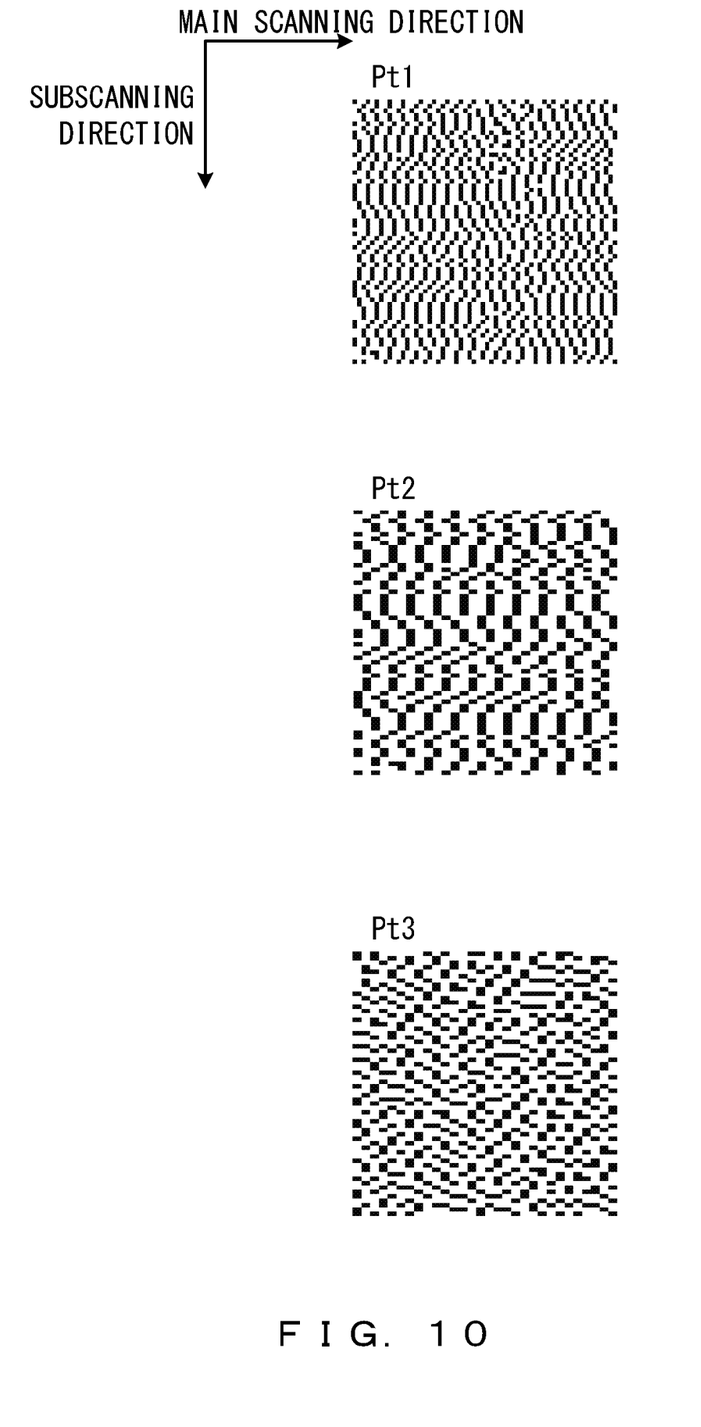
FIG. 10 illustrates examples of printed images for individual diffusion coefficients.

FIG. 10 illustrates printed images that have undergone binarization processing based on error diffusion processing that includes the conventional JJN coefficients. Each of the printed images in FIG. 10 is an enlargement of a portion of an actual printed image. Printed images Pt1 and Pt2 are based on the conventional JJN coefficients. The printed images Pt1 and Pt2 have a difference in resolution of input image data. A printed image Pt3 is based on the embodiment.

Figure 7A:
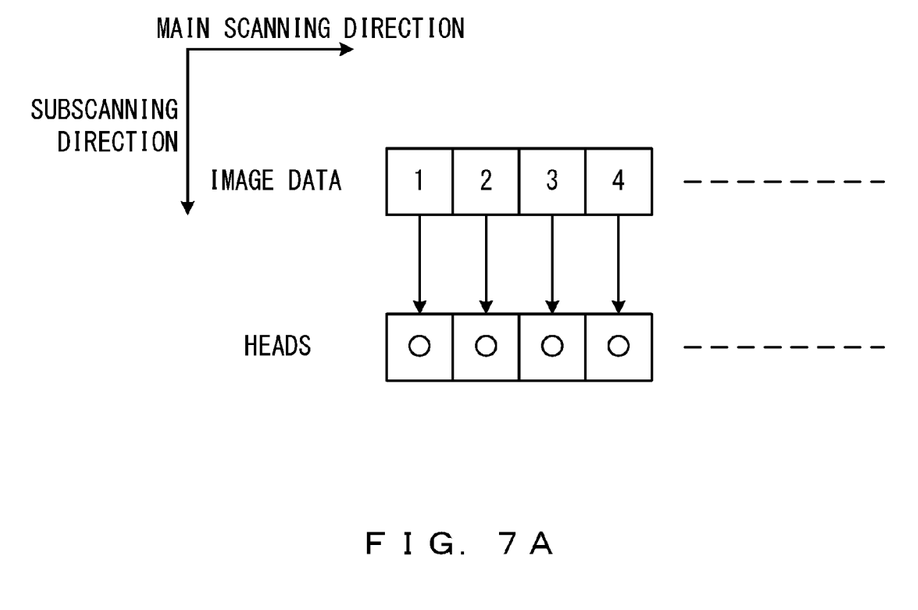
FIG. 7A illustrates a situation in which, for a main scanning direction, the resolution of image data is equal to a head resolution.
Figure 7B:
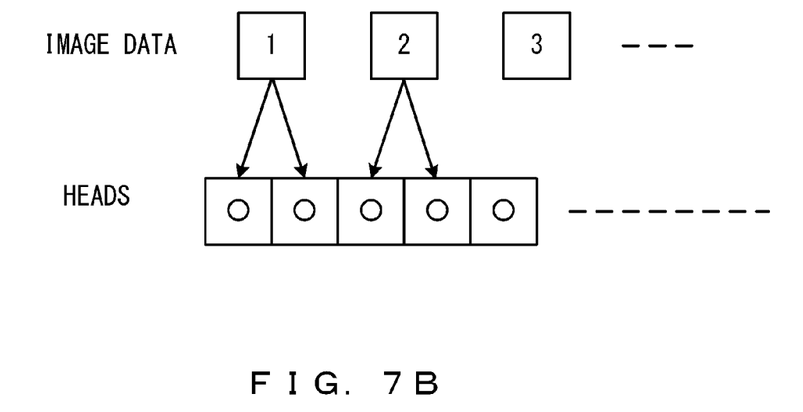
FIG. 7B illustrates a situation in which, for a main scanning direction, the resolution of image data is lower than a head resolution.

FIGS. 7A and 7B illustrate a relationship between the resolution of image data and a head resolution for the main scanning direction. The heads are thermal heads for forming a printing plate but may be inkjet heads. FIG. 7A illustrates a situation in which, for a main scanning direction, the resolution of image data is equal to a head resolution. This corresponds to, for example, a situation in which both the resolution of image data and the head resolution are 600 dpi (dots per inch). FIG. 7B illustrates a situation in which, for a main scanning direction, the resolution of image data is lower than a head resolution. This corresponds to, for example, a situation in which the resolution of image data is 300 dpi and the head resolution is 600 dpi. When, as depicted in FIG. 7B, the head resolution of the image formation apparatus is twice the resolution of input image data, the heads are driving-controlled in a manner such that the heads open for the same data of two pixels in the main scanning direction (overprinting scheme).

Descriptions are given by referring to FIG. 10 again. The printed image Pt1 is obtained when the resolution of image data and the head resolution are equal to each other for the main scanning direction in the situation depicted in FIG. 7A. The printed image Pt2 is obtained when the resolution of image data is half the head resolution for the main scanning direction in the situation depicted in FIG. 7B. Textures parallel to the subscanning direction are generated in both the printed images Pt1 and Pt2; the textures parallel to the subscanning direction in the printed image Pt2 are larger than those in the printed image Pt1. This is because the textures generated by error diffusion processing in the subscanning direction in the printed image Pt2 are double printed in the subscanning direction by overprinting, thereby becoming more noticeable.

Figure 8:
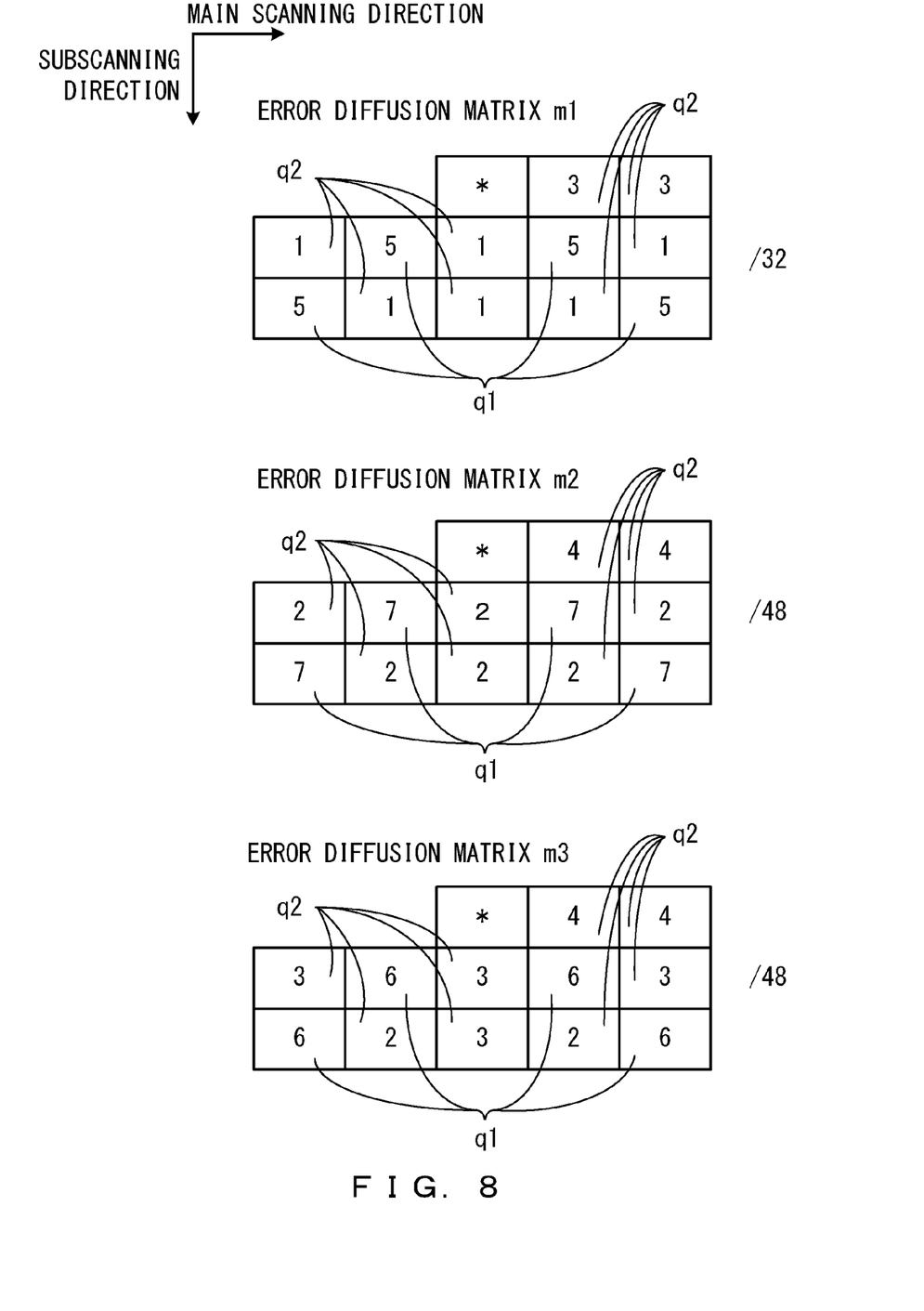
FIG. 8 illustrates exemplary error diffusion matrixes in accordance with an embodiment.
Figure 9:
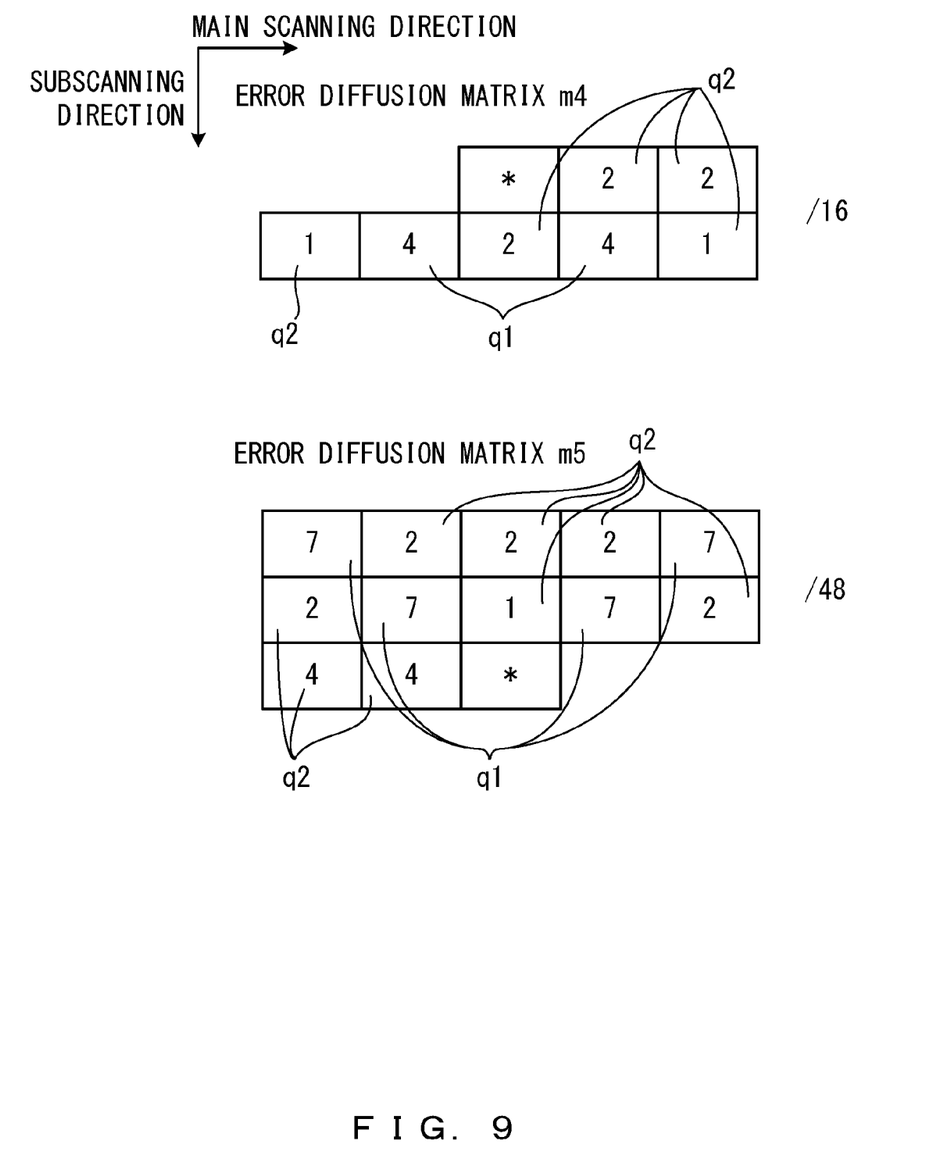
FIG. 9 illustrates other exemplary error diffusion matrixes in accordance with an embodiment.

The following describes an error diffusion matrix in accordance with the embodiment. FIGS. 8 and 9 illustrate exemplary error diffusion matrixes in accordance with the embodiment. The error diffusion matrix in accordance with the embodiment is such that the diffusion coefficients of pixels diagonal to a focused-on pixel are greater than those of other pixels. This allows textures that would be generated along the subscanning direction, among other things, to be decreased.

An error diffusion matrix m1 in FIG. 8 is a first example of the error diffusion matrix in accordance with the embodiment. The denominator of each diffusion coefficient is "1/32". A pixel indicated by "*" is a focused-on pixel. The diffusion coefficients of pixels q1 diagonal to the focused-on pixel is "5", and the diffusion coefficients of pixels q2 that are not diagonal to the focused-on pixel are "3" or "1".

The printed image Pt3 in FIG. 10 is an exemplary image obtained by performing overprinting by applying the error diffusion matrix m1, i.e., a matrix in which pixels diagonal to a focused-on pixel have a great diffusion coefficient. It is clear that there are far fewer textures in the subscanning direction in the printed image Pt3 than in the printed image Pt2. That is, applying error diffusion processing such as the error diffusion matrix m1 allows textures that would be generated by the conventional JJN-coefficient-based error diffusion processing to be remarkably decreased.

The diffusion coefficients of the error diffusion matrix of the embodiment are not limited to those of the error diffusion matrix m1. Error diffusion matrixes m2 and m3 in FIG. 8 are other exemplary error diffusion matrixes in which pixels diagonal to a focused-on pixel have a great diffusion coefficient, and the matrix sizes of the error diffusion matrixes m2 and m3 are the same as that of the error diffusion matrix m1 (5×3). The denominator of diffusion coefficients of the error diffusion matrixes m2 and m3 are "1/48". The error diffusion matrix m2 is such that the diffusion coefficients of pixels q1 diagonal to a focused-on pixel are "7", thereby making large the difference from "2" and "4", which are the diffusion coefficients of pixels q2 that are not diagonal to the focused-on pixel.

By contrast, the error diffusion matrix m3 is such that the diffusion coefficients of pixels q1 diagonal to a focused-on pixel are "6" and such that the diffusion coefficients of pixels q2 that are not diagonal to the focused-on pixel are "2", "3", or "4". The difference between each of the diffusion coefficients of pixels q1 diagonal to a focused-on pixel and each of those of pixels q2 that are not diagonal to the focused-on pixel is smaller in the diffusion matrix m3 than in the error diffusion matrix m2.

The error diffusion matrixes m2 and m3 may be stored in the matrix table 108 so that the error diffusion unit 106 can select either of those matrixes depending on conditions. For example, the error diffusion unit 106 may select either of the error diffusion matrixes according to a comparison between the resolution of input image data and the head resolution. In particular, when the resolution of image data is lower than the head resolution (FIG. 7B), the error diffusion unit 106 may use the error diffusion matrix m2, which achieves a higher diffusion effect; otherwise, the error diffusion unit 106 may use the error diffusion matrix m3.

FIG. 9 illustrates other exemplary error diffusion matrixes in accordance with the embodiment. An error diffusion matrix m4 in FIG. 9 has a matrix size of 5×2. The matrix size is not limited to 5×3, and various sizes may be selected. The denominators of diffusion matrixes are 1/16.

The error diffusion matrix m5 in FIG. 9 is such that the direction of binarization processing is opposite to that for the error diffusion matrix m2. The error diffusion matrix m4 is such that binarization processing is performed in a direction from the bottom right to the top left, and this is opposite to the example of FIG. 4.

In each of the error diffusion matrixes m1-m5, an equal value is set as the diffusion coefficients of pixels diagonal to a focused-on pixel, and this does not necessarily need to be satisfied. As long as the diffusion coefficients of pixels diagonal to a focused-on pixel are greater than those of the other pixels, any value can be the diffusion coefficients of the pixels diagonal to the focused-on pixel. For example, the error diffusion matrix m1 may be arranged in a manner such that the diffusion coefficients of pixels q1 diagonal to and close to the focused-on pixel are set to "5" and such that the diffusion coefficients of pixels q1 diagonal to and distant from the focused-on pixel are set to "4".

<Effect>

In the embodiment, a greater weight is assigned to diffusion coefficients in a diagonal direction of an error diffusion matrix so as to diffuse errors more greatly in the diagonal direction, so that textures can be decreased that would be generated in the subscanning direction by error diffusion processing. In particular, when the resolution of image data is lower than a head resolution, there has been a problem of generation of large textures in the subscanning direction due to overprinting because a print making unit double prints textures (overprinting) in the main scanning direction; however, the error diffusion matrix in accordance with the embodiment can decrease texture generation remarkably.

<Variation>

It has been stated that the image processor 20 is achieved by hardware-based processing, but portions of, or the entirety of, the image processor 20 may be achieved by software processing performed by a CPU that has read a control program.

In the described examples, the image processor 20 has been incorporated into the image formation apparatus 1. However, the image processor 20 may be separated from the image formation apparatus 1.

In the described examples, multi-valued image data from the scanner unit 10 is input to the image processor 20. However, multi-valued image data from an information processing terminal such as a PC (Personal Computer) may be transmitted to the image processor 20.

In the meantime, the present invention is not limited to the above mentioned embodiments as they are, but may be embodied in practical uses, by modifying components without departing from a gist of the embodiments. Further, by appropriately combining a plurality of components disclosed in the above mentioned embodiments, various inventions may be configured. For example, all of the components disclosed in the embodiments may be combined as appropriate. Further, the components may be combined appropriately over different embodiments. Within a scope of the invention that does not depart from the gist of the invention, various modifications or applications are possible, as a matter of course.

EXPLANATIONS OF LETTERS OR NUMERALS

1: Image formation apparatus
10: Scanner unit
20: Image processor
   20: Edge enhancement unit
   24: Density correction unit
   26: Binarization unit
30: Plate making unit
40: Printing unit
50: CPU
60: Temporary storage unit
70: Nonvolatile storage unit
100: Error addition unit
102: Binarization determination unit
104: Error calculation unit
106: Error diffusion unit
108: Matrix table
110: Error memory

What is claimed is:

1. An image processing apparatus that performs binarization processing of multi-valued image data using an error diffusion method so as to output binary image data to an image formation apparatus, the image processing apparatus comprising:
    an image processor that performs error diffusion processing by applying a predetermined error diffusion matrix to multi-valued image data having pixels two-dimensionally arranged in a main scanning direction that is a direction in which heads are arranged and in a subscanning direction orthogonal to the main scanning direction, so as to convert the multi-valued image data into binary image data, wherein
    the image processor applies, as the error diffusion matrix, an error diffusion matrix in which a diffusion coefficient of a pixel diagonal to a focused-on pixel is greater than diffusion coefficients of pixels other than the pixel diagonal to the focused-on pixel.

2. The image processing apparatus according to claim 1, wherein
    the image processor
        applies a first error diffusion matrix as the error diffusion matrix when a head resolution is equal to a resolution of image data for the subscanning direction,
        applies a second error diffusion matrix as the error diffusion matrix when the resolution of the image data is less than the head resolution for the main scanning direction, the second diffusion matrix having a larger difference between a diffusion coefficient of a pixel diagonal to a focused-on pixel and a diffusion coefficient of each of other pixels than the first error diffusion matrix.

\* \* \* \* \*